United States Patent [19]
Heilmayr

[11] 3,899,561
[45] Aug. 12, 1975

[54] METHOD OF MAKING PLASTIC SIDING

[75] Inventor: Peter F. Heilmayr, McPherson, Kans.

[73] Assignee: Certain-teed Products Corporation, Valley Forge, Pa.

[22] Filed: July 17, 1973

[21] Appl. No.: 380,017

Related U.S. Application Data

[60] Division of Ser. No. 243,205, April 12, 1972, Pat. No. 3,776,672, which is a continuation-in-part of Ser. Nos. 225,348, Feb. 10, 1972, abandoned, and Ser. No. 225,347, Feb. 10, 1972, abandoned, which is a division of Ser. No. 2,900, Jan. 14, 1970, abandoned, said Ser. No. 225,348, is a continuation of Ser. No. 2,900.

[52] U.S. Cl................ 264/151; 264/177 R; 264/295
[51] Int. Cl........................ B29c 17/00; B29c 17/14
[58] Field of Search............ 264/177 R, 210 R, 151, 264/285, 286, 284, 295, 320, 322, 339, 148, 160, 237, 293, 348, 327, 157, 209, 210

[56] References Cited
UNITED STATES PATENTS

| | | | |
|---|---|---|---|
| 2,294,555 | 9/1942 | Hendrie | 264/210 R |
| 2,952,037 | 9/1960 | Ruck et al. | 264/210 R |
| 3,281,516 | 10/1966 | Southwick | 264/285 |
| 3,454,694 | 7/1969 | Delaire et al. | 264/151 |

*Primary Examiner*—Robert F. White
*Assistant Examiner*—W. E. Hoag
*Attorney, Agent, or Firm*—Synnestvedt & Lechner

[57] ABSTRACT

The disclosed technique is adapted to production of siding from resin materials, especially polyvinyl chloride, and includes the use of sizing and shaping templates both above and below the horizontally extruded siding. Provision is made for cooling the lower convex side of the siding more rapidly than the upper concave side and for delivering refrigerated air to the siding in the downstream end of the cooling zone.

1 Claim, 11 Drawing Figures

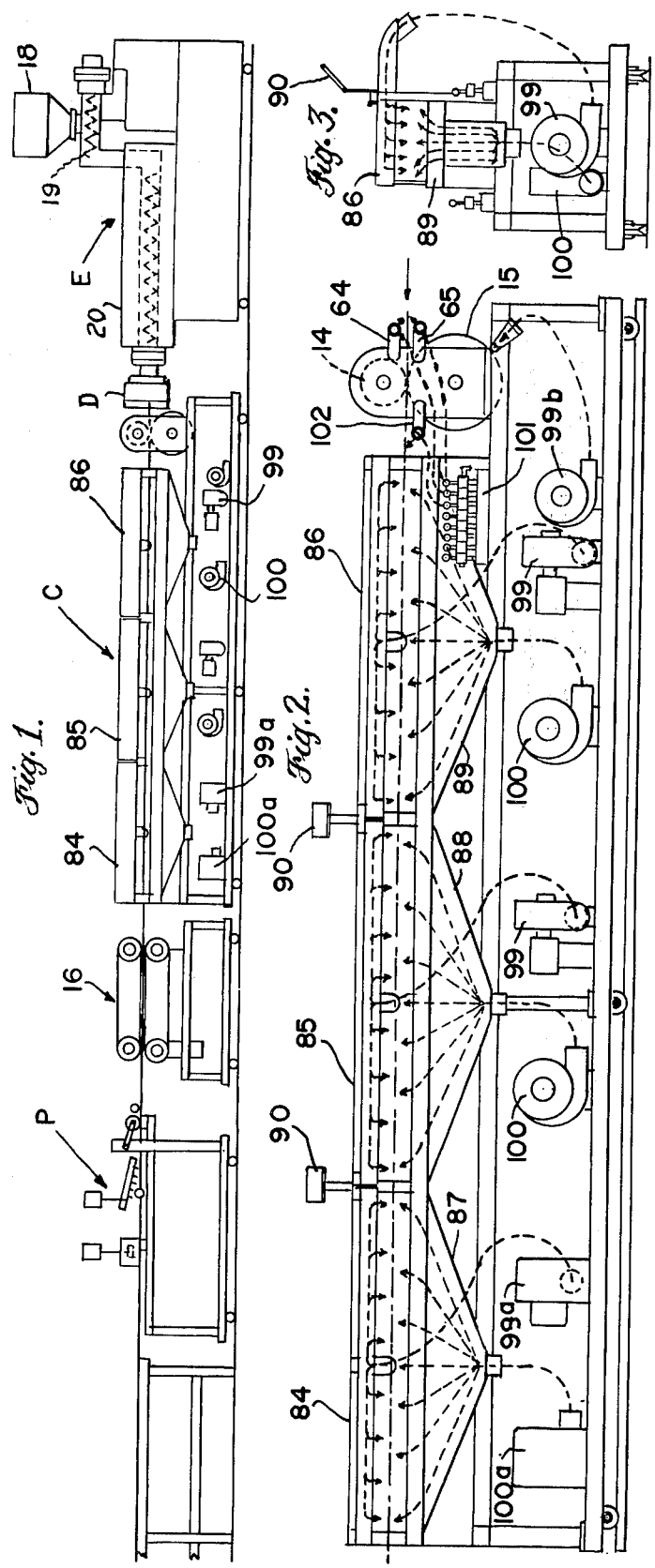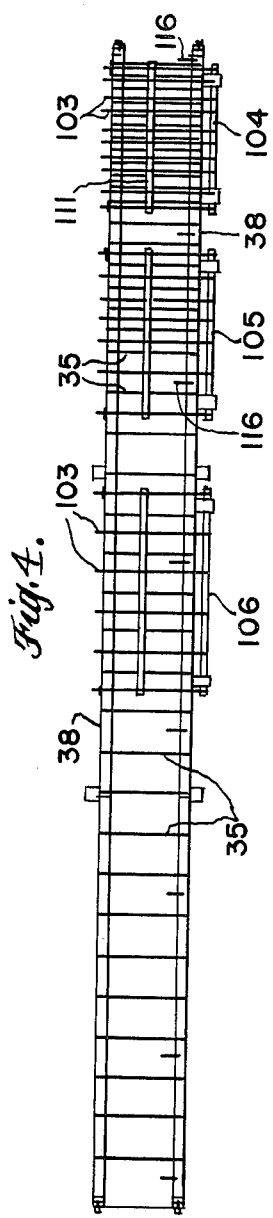

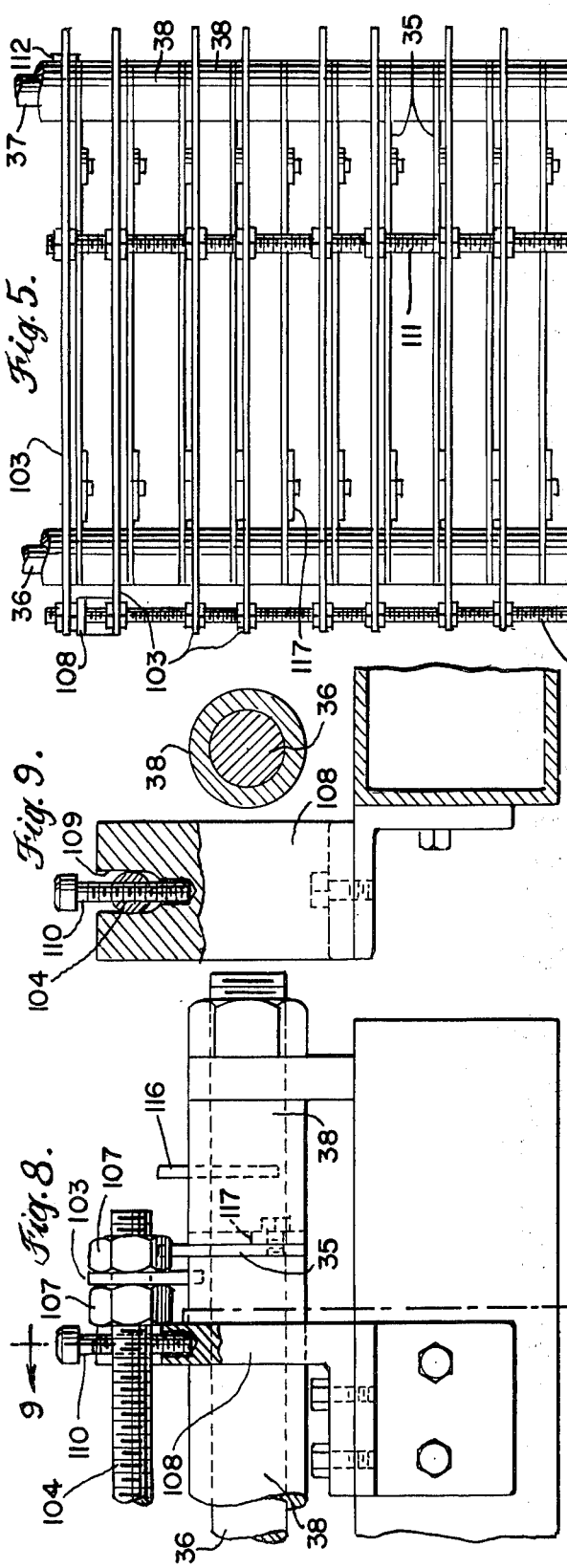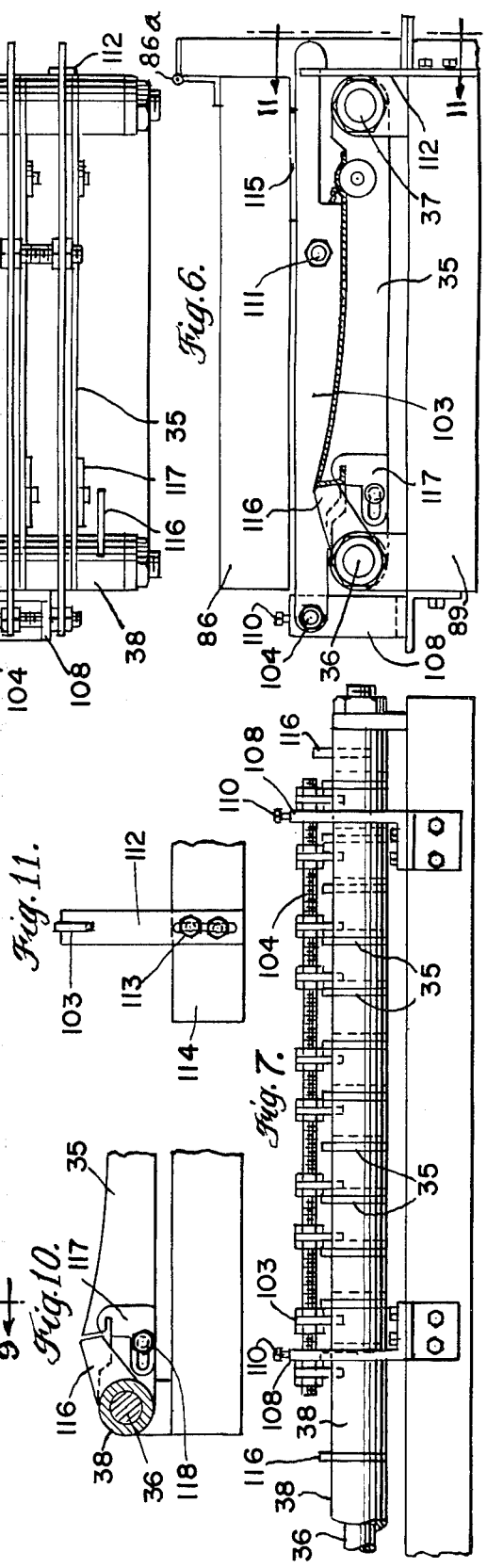

METHOD OF MAKING PLASTIC SIDING

CROSS REFERENCES TO RELATED APPLICATIONS

The present application is a division of application Ser. No. 243,205, filed Apr. 12, 1972 and issued Dec. 4, 1973 as U.S. Pat. No. 3,776,672, which prior application is a continuation-in-part of my prior applications Ser. No. 225,348 and Ser. No. 225,347, both filed Feb. 10, 1972, now abandoned, and which are, respectively, a continuation and a division of my application Ser. No. 2,900, filed Jan. 14, 1970, now abandoned; and the present application is also related to application Ser. No. 2,723, filed Jan. 14, 1970, jointly by me, Sol B. Kimbrell and Joseph C. Giuffre and issued on July 4, 1972 as U.S. Pat. No. 3,674,388, and the present application is also related to application Ser. No. 2,770, filed Jan. 14, 1970, jointly by me and Sol B. Kimbrell, which application Ser. No. 2,770 is now abandoned.

BACKGROUND AND STATEMENT OF OBJECTS

It is known to produce siding from thermoplastic resin materials and for this purpose extrusion techniques have been employed in accordance with which the resin material in plasticated form is extruded through a die orifice generally conforming with the cross sectional shape of the siding, after which the extruded siding is cooled to harden it. Thereafter appropriate lengths are cut from the hardened extrusion and various machining operations are applied. In operations of the kind above referred to it is also known to utilize polyvinyl chloride resin materials, usually formulated with pigment and other constitutents to impart special properties to the product.

The present invention is concerned with a number of improvements in a technique of the general kind just referred to, which improvements are adapted to facilitate the production of the siding and are also adapted to improve the characteristics of the siding in several respects.

For example, in accordance with prior techniques, the siding produced has frequently been characterized by a high gloss surface on the face or exposed side of the siding, and this is undesirable for at least most uses for such siding. Moreover, a wood or grain texture has been imparted to various prior sidings of the kind referred to, but notwithstanding such texture effects, the siding still retained the undesired high gloss or high light reflection and, in addition, the technique of imparting the grain texture has heretofore frequently resulted in loss of impact strength.

Major objects of the present invention are to overcome the foregoing difficulties and disadvantages and to provide a method and apparatus for production of siding from thermoplastic resin materials, especially polyvinyl chloride resin materials, which siding not only has a grain texture effect but which is further characterized by low gloss and high impact strength.

The present invention is also concerned with equipment and techniques to be used in the cooling and sizing of the siding after it is extruded. According to the present invention, cooling and sizing are effected primarily by the use of air and of templates having edges engaging the siding, rather than large surface areas such as are present in prior art sizing dies. This is of advantage, as contrasted with the use of extensive die surfaces for these purposes because the template and air sizing and cooling provides an improved surface texture, notably a texture which has much lower light reflection or gloss.

By the use of the template sizing and cooling, it is also possible to introduce the embossing step between the extruder and the sizing and cooling equipment, such embossing being desirable for the purpose of imparting a grain or similar texture effect at the surface.

The invention includes equipment and devices of special form which are capable of effecting effective cooling and accurate sizing.

Still further, it is an object of the present invention to provide a die structure in which the plasticated material is homogenized by passage through a die passage restriction in advance of the region in which the flow is equalized, thereby providing for increase in uniformity of admixture of the various constituents of which the resin mix is made up.

Still further objects of the present invention are to provide a method and apparatus characterized by exceptionally smooth and reliable operation, production of the siding without undesired ripple effects, and maintenance of a high degree of accuracy in shaping of the siding.

How the foregoing and other objects and advantages are attained will appear more fully from the following description referring to the accompanying drawings, in which:

BRIEF DESCRIPTION OF THE DRAWINGS

FIGS. 1 to 11 illustrate an embodiment of equipment for producing siding according to the invention, these views being briefly described as follows:

FIG. 1 is an overall outline view of the major components of the equipment;

FIG. 2 is a more or less diagrammatic elevational view of the cooling system of FIG. 1;

FIG. 3 is an end view of the equipment shown in FIG. 2;

FIG. 4 is a diagrammatic plan view of the assembly of templates used in this embodiment;

FIG. 5 is an enlarged plan view of a portion of the template assembly;

FIG. 6 is an end view of parts shown in FIG. 5;

FIG. 7 is a side elevational view taken from the left of FIG. 6;

FIG. 8 is an enlarged fragmentary view illustrating the mounting of the templates;

FIG. 9 is a cross section taken as indicated by the line 9-9 on FIG. 8;

FIG. 10 is a fragmentary detail view of a lower template; and

FIG. 11 is a detail view of a hold down device for upper templates, taken as indicated by the line 11—11 in FIG. 6.

DETAILED DESCRIPTION

An extruder mechanism indicated at E is shown at the right hand end of the production line. This extruder is adapted to receive powder polyvinyl chloride resin composition and to heat and plasticate the resin material and then deliver it into and through an extrusion die which is indicated at D.

The extrusion die is formed with various passages, including an inlet passage for receiving the plasticated resin from the extruder, and a discharge orifice of cross sectional shape generally conforming with the cross section of the siding being made.

After delivery of the siding from the discharge orifice of the die the siding still soft or plasticated condition is passed through the nip formed between a pair of rolls 14 and 15 one of which (14) is etched so as to emboss the siding and thereby impart a grain texture to the face side of the siding. After leaving the embosser, the siding passes into and through the equipment generally indicated at C which is provided for cooling and sizing the siding, thereby hardening the siding in the desired cross sectional shape and form. The siding is advanced through this cooling and sizing equipment by means of the puller mechansim indicated at 16.

The puller mechanism delivers the hardened siding to the station indicated at P in FIG. 1 at which lengths of the siding are cut off, nail holes are punched, and other operations are performed, as is described more fully in copending applications above identified.

Although from the standpoint of a number of features of the present invention, the extruder may comprise any of a variety of known types of extrusion equipment, it is preferred and contemplated according to the present invention that the extruder be of the multiple screw type. The extruder is adapted to be fed with the resin material in powder form, by delivery of such resin material into the hopper indicated at 18, from which it is delivered by the feed screw 19 into the barrel 20 surrounding the twin screws of the extruder.

It should also be understood that the discharge orifice of the die will not necessarily exactly correspond in size and shape to the siding to be made. Indeed, in order to compensate for swelling and shrinkage factors which are present particularly because of the extrusion of an article of unsymmetrical shape, it is preferred to utilize dimensions in the discharge orifice which are somewhat different from corresponding dimensions of the siding being made, as is brought out more fully in copending applications above identified.

After leaving the extrusion orifice of the die, the siding enters the nip between rolls 14 and 15 which constitute an embossing mechanism for imparting to the face surface of the siding a wood grain texture effect. In the embodiment illustrated the siding is extruded generally horizontally, with the face side presented upwardly, and the roll 14 is etched or otherwise configured to the desired grain texture in order to provide the grain texture effect upon the siding. Roll 15 is desirably rubber faced so as to provide a resilient backing for maintaining the siding in contact with the embossing roll 14.

After leaving the embossing rolls the siding enters cooling and sizing mechanism indicated in FIG. 1 at C and shown in greater detail in the other figures.

The air cooling devices include three upper and lower plenum chambers for air distribution, the three upper chambers being indicated at 84, 85 and 86 in FIG. 1 and 2 and the lower chambers at 87, 88 and 89. The cooling and sizing equipment is thus divided into three separately controllable cooling zones each comprising an upper and a lower plenum chamber. Each plenum chamber is provided with an air inlet and with air distributing discharge slots for spreading the cooling air over the surfaces of the siding. The upper plenum chambers 84, 85 and 86, one of which appears also in FIG. 3, are pivotally mounted for upward swinging movement in the manner which will be clear from FIG. 4 which shows a pivot 86a for the chamber 86. Rearwardly inclined supports 90 are provided, against which the upper plenum chambers may be supported when in the open position.

Preferably separate blowers are provided for each of the plenum chambers. Thus, the chamber 86, which is located at the entrance end of the equipment, is provided with a blower 99 and the lower chamber 89 in this region is provided with a blower 100. Similar blowers 99 and 100 are provided for the plenum chambers 85 and 88. Although the same type of blowers may be used for the plenum chambers 84 and 87 at the downstream end of the system, it is preferred to employ devices providing for delivery of cooled air, such as the devices indicated at 99a and 100a. These devices may comprise readily available air conditioning units, thereby providing for the delivery of cooled or refrigerated air to the final cooling section of the equipment.

A blower 99b is provided for delivering air to the roll 15 of the embosser.

With regard to the delivery of air through the plenum chambers it is to be noted that it is preferred to adjust the operation of the various blowers and air conditioners in order to provide for a larger air flow over the lower surface of the siding than over the upper surface thereof. This accelerates the cooling of the lower surface, as compared with the upper surface, and is of importance in minimizing tendencies toward warpage as a result of cooling.

FIG. 2 also illustrates a supply manifold 101 which may be connected with a standard source of "factory" compressed air, for instance air at a pressure of the order of 50–100 psi, this air being utilized for certain special cooling purposes by distribution through separately controllable valves which need not be considered in detail herein but which serve to deliver air, for example, to the air distributing pipes 64 and 65 which are adapted to direct air against the lips of the extrusion die in the manner disclosed in said copending applications. An air delivery pipe 102 may also be provided just downstream of the embossing rolls 14 and 15. Pipe 102 is arranged to direct air upwardly against the lower unembossed surface of the siding just before its entry into the cooling and sizing equipment C. This same supply header 101 may be utilized to deliver compressed air to other devices included in the cooling and sizing equipment, such as special edge formers described in the aforementioned copending applications. Not all of these same edge formers need necessarily be used, but where some of them are employed they may be supplied with compressed air in the manner indicated.

As shown in FIGS. 4–11, the sizing and template arrangements are in some respects similar to or the same as those described in the copending applications. For example, a series of templates 35 is arranged below the siding throughout the cooling and sizing equipment, the spacing of these templates being relatively small toward the upstream end of the system and greater toward the downstream end.

The sizing elements shown in FIG. 4-11 further include a series of templates 103 the shape of which appears clearly in FIG. 6, these templates having lower edges which are convexly curved in order to engage and size the upper concave surface of the siding. Although the templates 103 come in contact with the embossed surface of the siding panel, the fact that only an edge of the elements engages the siding surface is of importance in avoiding developing a high gloss on the textured surface of the siding. This is in contrast to extensive surface contact, for instance the surface of a forming passage as used in certain prior arrangements, in which the fact of extensive surface interengagement has a tendency to accentuate light reflection from the surface, and this is undesirable at the exposed face of the siding. The templates 103 engaging the siding with only narrow edges do not appreciably impair the desired surface characteristics.

The lower templates 35 are mounted by means of rods 36 and 37 and spacer sleeves 38. The upper templates 103 are divided into three groups (see FIG. 4) and the templates of each group are mounted at one end by means of threaded rods 104, 105 or 106. The templates are spaced from each other and secured in spaced relation by means of nuts such as shown at 107 in FIG. 8. Each rod, for instance the rod 104 shown in FIGS. 5–9, is mounted by means of brackets 108 at opposite ends thereof. These brackets are slotted at their upper edges as indicated at 109 in FIG. 9 and an adjustment screw 110 is threaded through the rod 104 and projects downwardly into an unthreaded socket in the bracket. By adjustment of the screw 110 the height of the rod 104 and thus of the adjacent ends of the templates may be varied.

Another threaded rod 111 interconnects the various templates in the group as shown in FIGS. 5 and 6, the zone of interconnection being intermediate the ends of the upper templates. The mounting and interconnection of the templates of each group provides for upward pivoting and swinging of the templates of the group as a unit in order to expose and gain access to the feed path for the siding through the equipment. The axis of pivoting of the group is the axis of the rod 104 (or 105 or 106). By the arrangement shown and described it is also possible to accurately adjust the height of the pivoted ends of the group of templates, so that the siding edges thereof may be precisely positioned in relation to the siding edges of the lower templates.

The other ends of the upper templates of each group are also adapted to be adjustably positioned, and for this purpose, a pair of brackets 112 are provided for each group. The upper end of each bracket 112 is slotted to receive the end of one of the templates 103. The lower end of each bracket 112 (see FIG. 11) is slotted and provided with adjustable fastening bolts 113 cooperating with the fixed structure 114 which may comprise a part of the lower plenum chamber 89. This provides for vertical adjustment of the brackets 112, so that the adjacent ends of the upper templates 103 may be accurately positioned in relation to the lower templates.

The upper and lower templates are preferably arranged so that they do not lie in common planes but are somewhat offset or spaced from each other in the direction of the feed path through the equipment.

The ends of the templates in the region of the adjustable brackets 112 may be held down in the slots at the top of the brackets 112 by the weight and action of the upper pivoted plenum chamber 86 (or 84 or 85), and for this purpose a resilient strip 115 (see FIG. 6) may be interposed between the lower edge of the plenum chamber 86 and the upper edges of the upper templates 103. The weight of the plenum chambers may also be relied upon to keep the adjustable screws 110 down against the bottom of the sockets provided in the brackets 108.

For the purpose of accurately shaping the butt edge of the siding being formed (see particularly FIG. 5, 6 and 10), forming elements 116 are mounted on sleeves 38. These elements are plate-like formers each having an edge so angled as to size and properly shape the lower surface of the butt edge of the siding, as clearly appears in FIG. 6 and 10. The elements 116 are movable or upwardly displaceable by virtue of the freedom for turning of the sleeve 38 upon the mounting rod 36. This provides for displacement of the formers 116 away from the feed path in order to facilitate threading of the siding through the cooling and sizing section.

An additional forming element or lip bracket 117 is mounted on each of a number of lower templates 35 (see FIGS. 5, 6 and 10), this bracket being adjustably positioned by means of a slotted opening cooperating with a fastening bolt 118. The upper end of this lip bracket is provided with a slot adapted to shape and size the upturned lip of the butt edge of the siding. Brackets 117 are desirably provided on the lower templates at least in the first group of templates at the upstream end of the cooling and sizing equipment, but ordinarily are not needed throughout the entire series of lower templates.

The selected resin composition is introduced into the feed hopper 18 of the extruder and is heated and plasticated by the extruder, and ultimately delivered thereby through the die D and out of the die orifice while still in its initial plasticated condition. The panel of the siding intervening between the butt and hanger edges is flat or planar as extruded but before any hardening or solidification of the resin in depth occurs, the flat panel of the siding is fed into the nip between the embossing rolls 14 and 15, and the texture effect is therefore imparted to the resin prior to hardening in depth.

The siding then passes while still in soft or plasticated condition into the sizing and cooling section of the equipment and the first of the sizing templates 35 is located quite close to the embossing rolls, in view of which the siding will readily conform with the curved templates. The siding then continues through all of the various sizing and cooling devices described above.

The sequence of operations just referred to and the manner in which they are performed is of great importance in the production of siding which is not only accurately formed but which also has an exceptionally desirable combination of characteristics both from the standpoint of physical characteristics and appearance of the product. The use of devices (64 and 65) for air cooling the lips of the die, and also the use of air cooling in the sizing and cooling section is of great importance in minimizing surface gloss, so that the siding produced has low light reflection. It will be observed that almost the entire exposed or face area of the panel intervening between the butt and hanger edges is cooled by means of cooling air only, and without the use of extensive metal cooling surfaces in contact with the product, which latter have a tendency to exaggerate the gloss and therefore the light reflection of the resin surface.

The shaping of the panel of the siding to its desired curved form only after the embossing has occurred not only permits use of a simple form of cylindrical embossing roll, but also is of importance because it places the embossing step in advance of the cooling and hardening stage and it has been found that this is of great importance in providing a siding of high impact strength. In certain prior production systems, an embossing step has been applied subsequent to the cooling and hardening of the extrusion, as by resoftening the surface layer to be embossed and then again rehardening that layer after the texture effect has been imparted to the article. This resoftening of the surface layer for the embossing results in shrinkage of the surface layer, with consequent development of stresses throughout the entire product when the surface layer has again been rehardened. The stresses remaining in the product in consequence of this prior technique have resulted in deterioration of the impact strength of the product.

In contrast with the prior technique just referred to, the system of the present invention (providing for embossing in advance of any appreciable cooling and hardening of the siding) eliminates the development of stresses referred to and provides a product of greatly increased impact strength. By way of example, the siding of the present invention has an impact strength at least as great as about 3 inches lbs. per mil of thickness, which is of the order of 50% higher than products embossed by other techniques.

It is therefore an improvement of striking character to provide a product which is not only embossed to provide a grain texture, but which also has both high impact strength and low light reflection. By employing various of the improvements provided according to the present invention the light reflection is kept below 50%, and usually and most advantageously below about 35%.

The provision of and the adjustability of the upper templates 103 provides for great accuracy in the shaping and sizing of the siding.

In considering the production of siding according to the present invention it is pointed out that although a variety of resin materials may be utilized, it is preferred to employ compositions of which the chief resin constituent is a polyvinyl chloride resin, most advantageously rigid polyvinyl chloride resin with an inherent viscosity value between about 0.8 and 1.1.

In one type of formulation which may be used, the resin system includes a tin or barium-cadmium stabilizer, and further incorporates a minor amount of an acrylic material such as methyl methacrylate, or a chlorinated polyethylene, either of which will serve as an impact modifier, to increase impact strength.

In such a typical composition, a pigment is desirably included, preferably a white pigment such as titanium dioxide, which may be employed in an amount equal to about from 8 to 16 parts by weight of the total composition. The presence of one or more lubricants is desirable to facilitate extrusion, for instance a combination of paraffinic and metal soap lubricants.

Commercially available compositions which contain polyvinyl chloride resin and which may be used according to the invention are sold under the tradenames GEON 85821 and GEON 85826 by B.F. Goodrich Mfg. Co.

In the preferred practice of the invention the resin compositions to be employed are used in powder blend form, rather than pellet form, and the powdered materials are desirably intimately intermixed before use. Compositions in the powder blend form are desirably employed not only because of the relatively low cost of the materials in that form, but also for other reasons. For example, a powder blend has less heat history than pellets which have previously undergone an extrusion and pelletizing operation. In view of this, siding made from a powder blend has greater remaining long term heat stability than would siding made from pelletized material. Moreover, where compositions are specially formulated to provide various desired physical and chemical characteristics, the employment of the materials in powdered form facilitates the blending of the specific composition desired.

I claim:

1. In the method of manufacturing siding boards having hanger and butt edges with an intervening panel by plasticating a thermoplastic resin material in a heated extruder, shaping the plasticated resin material by extruding it through a die orifice generally conforming with a desired cross sectional shape of the siding, cooling and rigidifying the extruded siding, and cutting the extrudate into siding board lengths, the improvement which comprises feeding rigid polyvinyl chloride resin material in powder form to the extruder, extruding the resin generally horizontally through a die orifice having a maximum dimension from 3 to 20% larger than the final width of the siding being made and having a flat mid portion for forming the panel of the siding which mid portion of the orifice is of thickness of from 25 to 75% of the thickness of the panel of the siding being made, embossing the upper side of the extrudate to impart a textured surface thereto, passing the embossed extrudate between and in contact with lower and upper series of spaced templets respectively having concavely curved edges and convexly curved edges for curving the extrudate to a shape having a concave upper side and a convex lower side and bringing the extrudate uniformly to the desired size, directing cooling air against both surfaces of the extrudate as the extrudate passes between the spaced templets to cool and rigidify the extrudate, the lower convex side of the extrudate bearing cooled faster than the upper concave side of the extrudate to minimize warping.

* * * * *